United States Patent [19]

Bessho et al.

[11] Patent Number: 6,129,986
[45] Date of Patent: Oct. 10, 2000

[54] LUMINOUS COMPOSITION AND ELECTROLUMINESCENT DEVICE COMPRISING THE SAME

[75] Inventors: Shinji Bessho, Suita; Satoshi Nishikawa, Shiga-gun, both of Japan

[73] Assignees: Sunstar Giken Kabushiki Kaisha, Tekatsuki, Japan; Uni-Sunstar B.V., Amsterdam, Netherlands

[21] Appl. No.: 09/035,856

[22] Filed: Mar. 6, 1998

[30]     Foreign Application Priority Data

Mar. 6, 1997 [JP] Japan ..................................... 9-051456

[51] Int. Cl.[7] ............................. H05B 33/20; C09K 11/02

[52] U.S. Cl. ......................... 428/421; 428/447; 428/690; 428/917; 313/502; 313/509; 252/301.35; 252/301.36

[58] Field of Search ......................... 252/301.36, 301.33, 252/301.35; 523/213; 313/502, 509; 428/690, 917, 421, 422, 447, 500

[56]                References Cited

U.S. PATENT DOCUMENTS

| 4,684,353 | 8/1987 | de Souza | 445/51 |
| 5,552,668 | 9/1996 | Hirose et al. | 313/506 |
| 5,641,968 | 6/1997 | Suzuki et al. | 250/484.4 |
| 5,777,038 | 7/1998 | Nishikawa et al. | 525/295 |
| 5,824,421 | 10/1998 | Kobayashi et al. | 428/447 |
| 5,830,028 | 11/1998 | Zovko et al. | 445/24 |

*Primary Examiner*—Marie Yamnitzky
*Attorney, Agent, or Firm*—Jacobson, Price, Holman & Stern, PLLC

[57]                ABSTRACT

A luminous composition containing (A) at least one polymer selected from the group consisting of a fluoropolymer and a graft polymer which is a fluoropolymer to which a cyanoethylated acrylic monomer is grafted, (B) an alkoxysilane compound having a primary amine group, (C) an alcohol having 1 to 4 carbon atoms, (D) a fluorescent material powder, and (E) an organic solvent, which is suitable for the formation of a luminous layer of an electro-luminescent device, since it improves the adhesion of the luminous layer to a transparent electrode, and has practically satisfactory pot life and moisture resistance.

13 Claims, No Drawings

LUMINOUS COMPOSITION AND ELECTROLUMINESCENT DEVICE COMPRISING THE SAME

BACKGROUND OF THE INVENTION

1. Field of the Invention

The present invention relates to a luminous composition and an electroluminescent (EL) device comprising the same. In particular, the present invention relates to a luminous composition which is useful for the formation of a luminous layer of a dispersion-type organic EL device, has improved adhesion to the transparent electrode of the EL device, and suffers from no or little deterioration of its pot life and moisture resistance, and a dispersion-type organic EL device having a luminous layer comprising such a luminous composition.

2. Description of Prior Art

In general, a dispersion-type organic electroluminescent device (hereinafter referred to as an "EL device") comprises a back electrode, a reflective insulation layer, a luminous layer and a transparent electrode, which are laminated in this order.

The luminous layer generally comprises a composition containing, as binder resins, various fluoropolymers (for example, homo- or copolymers of vinylidene fluoride, etc.), and recently graft polymers comprising such fluoropolymers to which cyanoethylated acrylic monomers are grafted (see, for example, JP-A-7-114988 and JP-A-8-134149).

However, a luminous layer, which is formed from a composition containing such fluoropolymers or graft polymers, a fluorescent material powder and an organic solvent, has low adhesion to a transparent electrode. Thus, the luminous layer tends to be peeled off from the transparent electrode during a cutting step, and the like. Therefore, a ratio of inferior devices increases. Furthermore, the EL devices have less flexing durability in use.

To improve the adhesion between the luminous layer and transparent electrode, following measures have been employed:

(1) lowering the glass transition temperature (Tg) of a used binder resin to soften the luminous layer, and (2) treating the surface of the transparent electrode.

In the case of the measure (1), the moisture resistance of the luminous layer deteriorates, and in turn, the deterioration of the luminous devices may be accelerated. In the case of the measure (2), the production cost of the EL devices increases.

In general, the adhesion between layers can be improved with the addition of silane coupling agents to one or both of the layers. However, when alkoxysilane compounds having a primary amino group (—NH$_2$) are compounded in the above fluoropolymers, the both materials react each other to form a gel, and thus the pot life after compounding greatly shortens. It is necessary for a practical pot life of a composition to meet a required time from compounding to the use in the production of EL devices and coating steps (using a doctor blade or by screen printing). In general, the composition should not be gelled about one day under storage conditions at a constant temperature of 40° C.

SUMMARY OF THE INVENTION

One object of the present invention is to provide a luminous composition comprising an alkoxysilane compound having a primary amino group, which composition is not gelled and thus has an improved pot life while maintaining moisture resistance.

Accordingly, the present invention provides a luminous composition comprising:

(A) at least one polymer selected from the group consisting of a fluoropolymer and a graft polymer which comprises a fluoropolymer to which a cyanoethylated acrylic monomer is grafted, (B) an alkoxysilane compound having a primary amine group, (C) an alcohol having 1 to 4 carbon atoms, (D) a fluorescent material powder, and (E) an organic solvent.

DETAILED DESCRIPTION OF THE INVENTION

The fluoropolymer used as the component (A) include homo- or Copolymers of fluorine-containing monomers such as vinylidene fluoride (VDF), hexafluoropropylene (HFP), chlorotrifluoroethylene (CTFE), tetrafluoroethylene (TFE), pentafluoropropylene (PFP), perfluoroalkyl vinyl ethers (e.g. perfluoromethyl vinyl ether (PFMVE), and the like; and copolymers of at least one of such fluorine-containing monomers and at least one other copolymerizable monomer. Among them, polyvinylidene fluoride and copolymers of vinylidene fluoride and at least one other fluorine-containing monomers (e.g. HFP, CTFE, TFE, PFP and PFMVE) (hereinafter referred to as "VDF copolymers"), that is, so-called vinylidene fluoride base rubbers are preferable. The VDF copolymers preferably comprises 50 to 85 mole % of VDF so that they have rubbery elasticity. Furthermore, fluoropolymers having radically active sites containing iodine or bromine atoms are preferable for the graft polymerization, which will be explained below.

The graft polymers, which may be used in place of or in addition to the above fluoropolymers, may be prepared by graft polymerizing a cyanoethylated acrylic monomer of the formula (I):

$$(CH_2\!=\!CR^1\!-\!COO)_{n-m}\!-\!R^2\!-\!(OCH_2CH_2CN)_m \qquad (I)$$

wherein $R^1$ is a hydrogen atom or a methyl group; and $R^2$ is a linear or branched n-valent alkylene group having 1 to 8 carbon atoms, which may optionally have a least one of an oxygen atom, a phenylene group, a hydrogenated phenylene group and an amino group; m is 1, 2 or 3; and n is an integer of 2 to 4, provided that m and n satisfy the relationship: $1 \leq m \leq (n-1)$, onto the fluoropolymers, optionally in the presence of organic solvent or other liquid media. The graft polymerization may be carried out by radical polymerization using conventional radical polymerization initiators, suspension polymerization, bulk polymerization, solution polymerization using radiation such as γ-rays, electron beams, etc. (radiation polymerization), and the like.

The monomer of the formula (I) will be referred to as "cyanoethyl monomer".

In the graft polymerization, the amount of the cyanoethyl monomer is usually between 10 and 90 wt. %, preferably between 20 and 70 wt. % of the total weight of the cyanoethyl monomer and fluoropolymer. When the amount of the cyanoethyl monomer is less than 10 wt. %, the dielectric constant of the graft polymer does not sufficiently increases. When the amount of the cyanoethyl monomer exceeds 90 wt. %, the moisture absorption of the graft polymer tends to increase.

The cyanoethyl monomer (I) may be prepared as follows:

Firstly, m moles of acrylonitrile is added to one mole of a n-valent polyhydroxyl compound of the formula (II):

$$R^2\text{—}(OH)_n \quad (II)$$

wherein $R^2$ and n are the same as defined above through the Michael addition reaction at a temperature of between 20 and 100° C. for 1 to 48 hours in the presence of an acidic or basic catalyst, and a cyanoethyl compound of the formula (III):

$$(HO)_{n-m}\text{—}R^2\text{—}(OCH_2CH_2CN)_m \quad (III)$$

wherein $R^2$, n and m are the same as defined above is obtained. Here, n and m satisfy the relationship: $1 \leq m \leq n-1$. Thus, (n-m) is at least one, and the cyanoethyl compound (III) has at least one hydroxyl group.

Then, the cyanoethyl compound of the formula (III) is esterified with (n-m) moles of acrylic or methacrylic acid or its chloride in the presence of a conventional acidic catalyst at a temperature between 50 and 150° C. for 4 to 48 hours to obtain a cyanoethyl monomer having no hydroxyl group.

Examples of the polyhydroxyl compound (II) are ethylene glycol, propylene glycol, 2-methyl-1,3-propanediol, 1,3-butylene glycol, 1,6-hexanediol, neopentyl glycol, diethylene glycol, dipropylene glycol, triethylene glycol, bisphenol A, hydrogenated bisphenol A, 1,4-dimethylolcyclohexane, glycerol, trimethylolethane, trimethylolpropane, trishydroxymethylaminomethane, pentaerythritol, and the like. Among them, glycerol and pentaerythritol are preferable.

The organic solvents or other liquid media may be any conventionally used ones, and preferably organic solvents such as acetone, methyl ethyl ketone, γ-butyrolactone, ethyl acetate, butyl acetate, tetrahydrofuran, dimethylformamide, N-methylpyrrolidone, and the like. It may be possible to carry out the polymerization in a dispersion in water or other organic solvents in which the fluoropolymers are not dissolved.

Examples of radical polymerization initiators used in the radial polymerization employed for the graft polymerization are peroxides (e.g. ketone peroxide, benzoyl peroxide, peroxyketal, hydroperoxide, dialkyl peroxides, diacyl peroxides, peroxyesters, peroxydicarbonate, etc.) and azo compounds (e.g. 2,2'-azobis(4-methoxy-2,4-dimethylvaleronitrile, 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, and the like.

The radiation polymerization does not always require polymerization initiators.

In the graft polymerization, aliphatic, aromatic or alicyclic mercaptans (e.g. n-butylmercaptan, octylmercaptan, dodecylmercaptan, benzylmercaptan, cyclohexylmercaptan, etc.) may be used for the adjustment of a molecular weight or the suppression of side reactions such as crosslinking.

At least one other copolymerizable monomer may be used in addition to the cyanoethyl monomer in the graft polymerization. The amount of the copolymerizable monomer(s) should be 50 wt. parts or less per 100 wt. parts of the cyanoethyl monomer.

The copolymerizable monomers used in the graft polymerization may be the same as or different from the copolymerizable monomers which have been referred to in connection with the fluoropolymers.

Common examples of such copolymerizable monomers are acrylate esters (e.g. methyl acrylate, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate, etc.), methacrylate esters (e.g. methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl methacrylate, tetrahydrofurfuryl methacrylate, 2-methoxyethyl methacrylate, 2-ethoxyethyl methacrylate, etc.), aromatic vinyl compounds, (e.g. styrene, α-methylstyrene, chloromethylstyrene, vinyltoluene, vinylnaphthalene, vinyl (alkyl)phenols, etc.), (meth)acrylates of alicyclic and aromatic alcohols (e.g. dicyclopentenyl (meth)acrylate, tricyclodecanyl (meth)acrylate, isobornyl (meth)acrylate, cyclohexyl (meth)acrylate, tetrahydrofurfuryl (meth)acrylate, benzyl (meth)acrylates, etc.), fluoroalkyl (meth)acrylates (e.g. 2,2,2-trifluoroethyl (meth)acrylate, 2,2,3,3-tetrafluoropropyl (meth)acrylate, 2-(perfluoro-3-methylbutyl)ethyl (meth)acrylate, 2,2,3,3,3-pentafluoropropyl (meth)acrylate, 1,1,1,3,3,3-hexafluoropropyl (meth)acrylate, octafluoropentyl (meth)acrylate, etc.), (meth)acrylamide, N-substituted (meth) acrylamides of aliphatic, alicyclic or aromatic hydrocarbons (e.g. N-dimethylacrylamide, N-dibutylacrylamide, N-diphenylacrylamide, etc.), monovinyl compounds (e.g. vinyl alcohol esters, acrylonitrile, methacrylonitrile, acrylic acid, methacrylic acid, maleic anhydride, maleic acid and its esters, fumaric acid and its esters, itaconic acid and its esters, allyl alcohol and its esters, vinyl chloride, vinylidene chloride, vinylpyridine, vinylpyrrolidone, vinyl alkyl ethers, vinylidene fluoride, vinylidene cyanide, styrenesulfonic acid, etc.), polyvinyl compounds (e.g. divinylbenzene, (meth)acrylates of polyhydric alcohols and polyhydroxy compounds, esters of polybasic acids with allyl alcohol, esters of polybasic acids with vinyl alcohol, allyl (meth) acrylate, etc.), compounds having at least one mercapto group in a molecule, disulfide compounds, 4-methacryloxyethyltrimellitic anhydride, acid phosphoxyethyl methacrylate, vinyl acetate, vinyl propionate, vinyl versatate, butadiene, and the like.

When the radiation polymerization is carried out with γ-ray, acid-scavengers for capturing hydrogen fluoride which may be generated are preferably used. Examples of the acid-scavengers are calcium hydroxide, magnesium oxide, lead oxide, calcium oxide, and the like.

The alkoxysilane compound having a primary amino group used as the component (B) in the present invention functions as adhesion-producers or crosslinking agents for the component (A). Examples of the alkoxysilane compound (B) are γ-aminopropyltriethoxysilane, γ-aminopropyltrimethoxysilane, γ-aminopropylmethyidimethoxysilane, γ-aminopropylmethyidiethoxysilane, N-β-(aminoethyl)-γ-aminopropyltrimethoxysilane, N-[(3-trimethoxysilyl)propyl]-diethylenetriamine, N-[(3-trimethoxysilyl)propyl]triethylenetetramine, N-3-trimethoxysilylpropyl-m-phenylenediamine, N,N-bis[3-trimethoxysilyl)propyl]ethylenediamine, 3-[N-allyl-N-(2-aminoethyl)]aminopropyltrimethoxysilane, p-[N-(2-aminoethyl)-aminomethyl]phenethyltrimethoxysilane, 3-aminopropyltris(trimethylsiloxy)silane, and the like, and at least one of them is used. The amount of the alkoxysilyl compound (B) is usually between 0.2 and 10 wt. parts, preferably between 0.5 and 5 wt. parts, per 100 wt. parts of the component (A). When the amount of the component (B) is less than 0.2 wt. parts, the intended improvement of the adhesion is not attained. When the amount of the alkoxysilane compound (B) exceeds 10 wt. parts, it is outside the range in which the pot life is improved. Furthermore, the slight amount of the unreacted alkoxysilane compound (B) remains in the formed luminous layer, and thus the dielectric loss factor tan δ tends to increase.

The alcohol used as the component (C) in the present invention functions as a stabilizer which suppresses the gelling reaction caused by the alkoxysilane compound (B), and thus maintains the pot life. The alcohol (C) has 1 to 4 carbon atoms, preferably the same number of carbon atoms as that in the alkoxy group of the alkoxysilane compound (B). Examples of the alcohol are methanol, ethanol, n-propanol, isopropanol, n-butanol, isobutanol, tert.-butanol, and the like, and at least one of them is used.

The amount of the alcohol (C) is usually between 0.2 and 10 wt. parts, preferably between 0.5 and 5 wt. parts, per 100 wt. parts of the component (A). When the amount of the alcohol (C) is less than 0.2 wt. parts, the gelling reaction is not effectively suppressed. When the amount of the alcohol (C) exceeds 10 wt. parts, the alcohol tends to interfere the dissolution of the binder resins and to cause the separation of the resins, and thus the homogeneity of the composition deteriorates.

In addition to the alcohol having 1 to 4 carbon atoms (C) (as a stabilizer), various silane compounds having hydrolyzable groups or carboxylic acids may be used for supplementing the stabilization effect of the alcohol (C).

The silane compounds having the hydrolyzable group (hereinafter referred to as "hydrolyzable silanes") function as dehydrating agents. Examples of the hydrolyzable silanes are vinylalkoxylsilanes (e.g. vinyltrimethoxysilane, vinyltris (methoxyethoxy)silane, vinyltriethoxysilane, vinylmethyldiethoxysilane, vinylmethyidimethoxysilane, vinyidimethylmethoxysilane, etc.), (meth) acryloylalkoxysilanes (e.g. γ-acryloxypropyltrimethoxysilane, γ-methacryloxypropyltrimethoxysilane, γ-acryloxypropylmethyldimethoxysilane, γ-methacryloxypropylmethyldimethoxysilane, etc.), epoxyalkoxysilanes (e.g. γ-glycidoxypropyltrimethoxysilane, γ-glycidoxypropylmethyldimethoxysilane, β(3,4-epoxycyclohexyl)ethyltrimethoxysilane, etc.), mercaptoalkoxysilanes (e.g. γ-mercaptopropyltrimethoxysilane, γ-mercaptopropylmethyidimethoxysilane, etc.), alkylalkoxysilanes (e.g. methyltriethoxysilane, methyltrimethoxysilane, ethyltriethoxysilane, dimethyldimethoxysilane, trimethylmethoxysilane, etc.), γ-ureidopropyltrialkoxysilane, γ-isocyanatepropyltriethoxysilane, alkoxysilanes having a secondary amino group (-NH-) (e.g. bis(γ-trimethoxysilylpropyl)amine, N-phenyl-γ-aminopropyltrimethoxysilane, etc.), and the like, and at least one of them is used.

The amount of the hydrolyzable silane is usually between 0.1 and 10 wt. parts, preferably between 0.25 and 3 wt. parts, per 100 wt. parts of the component (A).

The carboxylic acids neutralize the —NH$_2$ group of the alkoxysilane compound (B) to decrease pH, and thus lowers the hydrolyzing rate of the alkoxysilyl group. The carboxylic acids preferably have 1 to 9 carbon atoms. Examples of the carboxylic acids are formic acid, acetic acid, propionic acid, 2-ethylhexanoic acid, butyric acid, isobutyric acid, pivalic acid, valeric acid, isovaleric acid, caproic acid, 2-ethylbutyric acid, caprylic acid, oxalic acid, malonic acid, succinic acid, glutaric acid, adipic acid, and the like, and at least one of them is used.

The amount of the carboxylic acid is usually from 0.7 to 1.2 times, preferably from 0.9 to 1.05 times the neutralization equivalent of the alkoxysilane compound (B).

Carboxylic acids having a boiling or sublimation point or a decomposition temperature of 180 to 250° C. or higher are not preferable, since they may remain in the formed luminous layer, and increase tan δ.

The fluorescent material powder used as the component (D) in the present invention may be any conventional fluorescent material powder. Examples of the fluorescent materials are zinc sulfide or zinc selenide to which Cu, Mn, Al, Cl or Br is added.

The amount of the fluorescent material powder is usually between 300 and 1000 wt. parts per 100 wt. parts of the component (A).

The organic solvent used as the component (E) may be any organic solvents in which the components (A), (B) and (C) can be dissolved. Preferable examples of the organic solvent are N,N-dimethylformamide, N,N-dimethylacetamide, dimethylsulfoxide, N-methyl-2-pyrrolidone, γ-butyrolactone, glycol ether acetates (e.g. ethylene glycol monoethyl ether acetate, propylene glycol monoethyl ether acetate, ethylene glycol monobutyl ether acetate, etc.), cyclohexanone, isophorone, and the like.

The amount of the organic acid is usually between 100 and 200 wt. parts per 100 wt. parts of the component (A).

The luminous composition of the present invention comprises the above components (A) to (E) in the specified amounts, and optionally other conventionally used additives such as fillers, dyes, pigments, and the like.

The EL device according to the present invention comprises a back electrode, a reflective insulation layer, a luminous layer, and a transparent electrode, which are laminated in this order, and is characterized in that the luminous layer comprises the luminous composition of the present invention.

The EL device may be produced as follows:

(i) A mixture of a dielectric binder resin and an inorganic dielectric material powder (for example, titanium oxide, barium titanate, barium zirconate, barium stannate, strontium titanate, etc.) in an organic solvent is applied on one surface of a back electrode, and heated and dried to form a reflective insulation layer. Then, the luminous composition of the present invention is applied on the reflective insulation layer, and heated and dried to form a luminous layer. After that, a transparent electrode is laminated on the luminous layer and heat pressed.

(ii) Alternatively, a reflective insulation layer is formed on a back electrode while a luminous layer is formed on a transparent electrode. Then, the electrodes are laminated with the reflective insulation layer and the luminous layer facing each other, and heat pressed.

EXAMPLES

The present invention will be illustrated by the following Examples.

Examples 1–12 and Comparative Examples 1–4

Components were compounded in amounts shown in Table 1 and dispersed with three-roll mill to obtain a pasty luminous composition. Then, the composition was subjected to the following performance tests:

1) Pot life

A luminous composition was stored in a constant-temperature furnace kept at 40° C. After one day and four days, the change of the composition from the past state was observed.

A: No change
B: Increase of viscosity
C: Gelled

2) Adhesion (to a transparent electrode)

A transparent electrode was formed by vapor depositing indium oxide-indium tin (ITO) on a polyethylene terephthalate (PET) film. Then, a luminous composition was screen printed on the transparent electrode and dried to form a luminous layer having a thickness of about 50 μm. The luminous layer was cross cut, and the presence of peeling of the layer along the cross-cut line was checked with an eye.

A: No peeling
B: Peeling

3) Moisture resistance

A luminous composition was applied on an aluminum plate and dried to form a film having a thickness of about 100 μm. Then, the same composition but containing no fluorescent material powder was coated on the film and dried. The total thickness of the coated films was about 150 μm. Aluminum was vacuum deposited on the film to form an electrode to obtain a mock EL device.

Tan δ of the mock EL device was measured with a LCZ meter at a frequency of 100 Hz at 60% RH, at 20° C. or 40° C., and a moisture resistance (%) was calculated according to the following equation:

Moisture resistance (%)=[(Tan δ at 40°C./tan δ at 20° C.)×100]−100

The larger moisture resistance (%) means the larger content of water-absorbing or polar low molecular weight components, and indicates the lower durability of the EL device.

The results are shown in Table 1.

TABLE 1

| | Example No. | | | | | | | |
|---|---|---|---|---|---|---|---|---|
| | 1 | 2 | 3 | 4 | 5 | 6 | 7 | 8 |
| (A) Graft polymer[1] | 100 | 100 | 100 | 100 | 100 | 100 | 100 | 100 |
| (B) Aminoalkoxysilane[2] | 0.5 | 1.0 | 2.0 | 2.0 | 2.0 | 2.0 | 2.0 | 2.0 |
| (C) Ethanol | 0.5 | 1.0 | 2.0 | 2.0 | 2.0 | 2.0 | 2.0 | 2.0 |
| -Hydrolyzable silane[3] | | | | | | | | |
| I | — | — | 1.0 | 1.0 | — | — | — | — |
| II | — | — | — | — | 1.0 | — | — | — |
| III | — | — | — | — | — | 1.0 | — | — |
| IV | — | — | — | — | — | — | 1.0 | — |
| V | — | — | — | — | — | — | — | 1.0 |
| VI | — | — | — | — | — | — | — | — |
| VII | — | — | — | — | — | — | — | — |
| -Formic Acid | — | — | — | — | — | — | — | — |
| -Acetic acid | — | — | — | — | — | — | — | — |
| -2-Ethylhexanoic acid | — | — | — | 1.303 | 1.303 | 1.303 | 1.303 | 1.303 |
| (D) Fluorescent material powder[4] | 600 | 600 | 600 | 600 | 600 | 600 | 600 | 600 |
| (E) Organic solvent[5] | 150 | 150 | 150 | 150 | 150 | 150 | 150 | 150 |
| Pot life  After 1 day | A | B | A | A | A | A | A | A |
| After 4 days | C | C | B | B | A | A | A | A |
| Adhesion | A | A | A | A | A | A | A | A |
| Moisture resistance (%) | +50 | +46 | +55 | +73 | +60 | +58 | +67 | +55 |

| | Example No. | | | | Comparative Example No. | | | |
|---|---|---|---|---|---|---|---|---|
| | 9 | 10 | 11 | 12 | 1 | 2 | 3 | 4 |
| (A) Graft polymer[1] | 100 | 100 | 100 | 100 | 100 | 100 | 100 | 100 |
| (B) Aminoalkoxysilane[2] | 2.0 | 2.0 | 2.0 | 2.0 | — | 0.5 | — | — |
| (C) Ethanol | 2.0 | 2.0 | 2.0 | 2.0 | — | — | — | — |
| -Hydroxyzable silane[3] | | | | | | | | |
| I | — | — | 1.0 | 1.0 | — | — | — | — |
| II | — | — | — | — | — | — | — | — |
| III | — | — | — | — | — | — | — | — |
| IV | — | — | — | — | — | — | — | — |
| V | — | — | — | — | — | — | — | — |
| VI | 1.0 | — | — | — | — | — | 0.5 | — |
| VII | — | 1.0 | — | — | — | — | — | 0.5 |
| -Formic Acid | — | — | — | 0.416 | — | — | — | — |
| -Acetic acid | — | — | 0.503 | — | — | — | — | — |
| -2-Ethylhexanoic acid | 1.303 | — | — | — | — | — | — | — |
| (D) Fluorescent material powder[4] | 600 | 600 | 600 | 600 | 600 | 600 | 600 | 600 |
| (E) Organic solvent[5] | 150 | 150 | 150 | 150 | 150 | 150 | 150 | 150 |
| Pot life  After 1 day | A | A | A | A | A | C[6] | A | A |
| After 4 days | A | A | A | A | A | — | B | A |
| Adhesion | A | A | A | A | B | A | B | B |
| Moisture resistance (%) | +61 | +71 | +68 | +59 | +82 | +25 | +75 | +70 |

Notes for Table 1:
[1] A cyanoethylated acrylic monomer-grafted fluororubber binder resin "RD 4058C" manufactured by SUNSTAR Engineering Inc.
[2] γ-Aminopropyltriethoxysilane "A1100" manufactured by NIPPON UNICAR Co., Ltd.

TABLE 1-continued

[3]Hydrolyzable silanes:
I: Vinyltrimethoxysilane "A171" manufactured by NIPPON UNICAR Co., Ltd.
II: Vinyltris(methoxyethoxy)silane "A172" manufactured by NIPPON UNICAR Co., Ltd.
III: γ-Merthacryloxypropyltrimethoxysilane "A174" manufactured by NIPPON UNICAR Co., Ltd.
IV: γ-Glycidoxypropyltrimethoxysilane "A187" manufactured by NIPPON UNICAR Co., Ltd.
V: γ-Mercaptopropyltrimethoxysilane "A189" manufactured by NIPPON UNICAR Co., Ltd.
VI: Bis(γ-trimethoxysilylproyl)amine "A1170" manufactured by NIPPON UNICAR Co., Ltd.
VII: N-phenyl-γ-aminopropyltrimethoxysilane "Y 9669" manufactured by NIPPON UNICAR Co., Ltd.
[4]Zinc sulfide fluorescent material "SILVANIA #41" manufactued by SILVANIA, USA.
[5]Ethylene glycol monoethyl ether acetate.
[6]Gelled only after one day storage at 20° C.

As seen from the results in Table 1, all the compositions of Examples 1–12, which contained the aminoalkoxysilanes, have no substantial drawbacks in their practical pot life and moisture resistance, and had improved adhesion to the transparent electrode. On the contrary, the composition of Comparative Example 2 had very short pot life, although it had the intended adhesion to the transparent electrode. The compositions of Examples 1 and 2 were gelled after 4 days at 40° C, but these conditions were much severer than the practical conditions, and thus these compositions have no problems in the practical use.

What is claimed is:

1. A luminous composition comprising:
   (A) at least one fluoropolymer to which a cyanoethylated acrylic monomer is grafted,
   (B) an alkoxysilane compound having a primary amine group,
   (C) an alcohol having 1 to 4 carbon atoms at an amount by weight of 0.2–10 parts per 100 parts of polymer (A),
   (D) a fluorescent material powder, and
   (E) an organic solvent.

2. A luminous composition according to claim 1, wherein said alkoxysilane compound having a primary amine group (B) is at least one compound selected from the group consisting γ-aminopropyltriethoxysilane, γ-aminopropyltrimethoxysilane, γ-aminopropylmethyldimethoxysilane, γ-aminopropylmethyldiethoxysilane, N-β-(aminoethyl)-γ-aminopropyltrimethoxysilane, N-[(3-trimethoxysilyl)propyl]diethylenetriamine, N-[(3-trimethoxysilyl)propyl]triethylenetetramine, N-3-trimethoxysilylpropyl-m-phenylenediamine, N,N-bis[3-trimethoxysilyl)propyl]ethylenediamine, 3-[N-allyl-N-(2-aminoethyl)]amninopropyltrimethoxysilane, p-[N-(2-aminoethyl)aminomethyl]phenethyltrimethoxysilane and 3-aminopropyl-tris(trimethylsiloxy)silane, and is contained in an amount of between 0.2 and 10 wt. parts per 100 wt. parts of said polymer (A).

3. A luminous composition according to claim 1, wherein said alcohol having 1 to 4 carbon atoms (C) is at least one alcohol selected from the group consisting of methanol, ethanol, n-propanol, isopropanol, n-butanol, isobutanol and tert.-butanol, and is contained in an amount of between 0.2 and 10 wt. parts per 100 wt. parts of said polymer (A).

4. A luminous composition according to claim 1, which further comprises at least one compound selected from the group consisting of carboxylic acids and hydrolyzable group-containing silane compounds except alkoxysilane compounds having a primary amino group.

5. A luminous composition according to claim 4, which comprises said hydrolyzable group-containing silane compound except an alkoxysilane compound having a primary amino group in an amount of between 0.1 and 10 wt. parts per 100 wt. parts of said polymer (A).

6. A luminous composition according to claim 4, which comprises said carboxylic acid in an amount of from 0.7 to 1.2 times the neutralization equivalent of said alkoxysilane compound having a primary amine group.

7. A luminous composition according to claim 4, wherein said carboxylic acid has 1 to 9 carbon atoms.

8. A luminous composition according to claim 1, which further comprises at least one carboxylic acid and at least one hydrolyzable group-containing silane compound except an alkoxysilane compound having a primary amino group.

9. A luminous composition according to claim 8, wherein an amount of said hydrolyzable group-containing silane compound except an alkoxysilane compound having a primary amino group is between 0.1 and 10 wt. parts per 100 wt. parts of said polymer (A), and an amount of said carboxylic acid is from 0.7 to 1.2 times the neutralizing equivalent of said alkoxysilane compound having a primary amine group.

10. A luminous composition according to claim 8, wherein said carboxylic acid has 1 to 9 carbon atoms.

11. A luminous composition according to claim 1, wherein the organic solvent is N,N-dimethylformamide, N,N-dimethylacetamide, dimethylsulfoxide, N-methyl-2-pyrrolidone, γ-butyrolactone, a glycol ether acetate, cyclohexanone, or isophorone.

12. A luminous composition according to claim 11, wherein the glycol ether acetate is ethylene glycol monoethyl ether acetate, propylene glycol monoethyl ether acetate, or ethylene glycol monobutyl ether acetate.

13. An organic electroluminescent device comprising a black electrode, a reflective insulation layer, a luminous layer, and a transparent electrode, which are laminated in this order, wherein said luminous layer comprises a luminous composition comprising:
   (A) at least one fluoropolymer to which a cyanoethylated acrylic monomer is grafted,
   (B) an alkoxysilane compound having a primary amine group, and
   (C) a fluorescent material powder.

* * * * *